United States Patent
Soref

[11] 3,834,794
[45] Sept. 10, 1974

[54] LIQUID CRYSTAL ELECTRIC FIELD SENSING MEASUREMENT AND DISPLAY DEVICE

[75] Inventor: Richard A. Soref, Chestnut Hill, Mass.

[73] Assignee: Beckman Instruments, Inc., Fullerton, Calif.

[22] Filed: June 28, 1973

[21] Appl. No.: 374,460

[52] U.S. Cl. .................................. 350/160 LC
[51] Int. Cl. ............................................ G02f 1/28
[58] Field of Search ................... 350/160 LC, 160 R

[56] References Cited
UNITED STATES PATENTS

| | | | |
|---|---|---|---|
| 3,674,342 | 7/1972 | Castellano et al. | 350/160 LC |
| 3,727,527 | 8/1973 | Borowski et al. | 350/160 LC |

Primary Examiner—Ronald L. Wibert
Assistant Examiner—Paul K. Godwin
Attorney, Agent, or Firm—R. J. Steinmeyer; J. M. Thomson

[57] ABSTRACT

A flat panel, electric field controlled device is provided for the measurement and display of electrical parameters such as voltage, the voltage sensing effect being provided by a nematic liquid crystal medium having high positive dielectric anisotropy and placed in a thin flat-sided optically transparent cell. Optical transmission of the nematic liquid crystal medium is controlled by voltages applied to interdigital arrays of parallel electrode elements affixed on the inner surface of only one of the transparent parallel cell walls. Continuous relative changes in the respective potentials applied to the electrode arrays provide continuous analog movement of the borders between birefringent and non-birefringent areas formed in the liquid crystal medium.

10 Claims, 6 Drawing Figures

LIQUID CRYSTAL ELECTRIC FIELD SENSING MEASUREMENT AND DISPLAY DEVICE

BACKGROUND OF THE INVENTION

1. Field of the Invention

The invention relates to electrically controllable panel display devices employing positive dielectric anisotropy liquid crystalline materials as electric field active media and more particularly relates to such display devices in which the size, shape, or location of two-dimensional display patterns may be changed continuously in analog fashion.

2. Description of the Prior Art

Nematic liquid crystal materials have been found in the past to offer utility in electric current controlled turbulence effect displays of the flat panel type. Such displays have generally been realized in types which vary the size, shape, or location of the display pattern in a discontinuous or digital fashion, though the R. A. Soref U.S. Pat. No. 3,675,988 for "Liquid Crystal Electro-Optical Measurement and Display Devices," issued July 11, 1972 and assigned to the Sperry Rand Corporation, illustrates a continuously variable analog display device which may be used as a turbulence display and over which the present invention is an improvement.

While prior art turbulence displays make advantageous use of some of the properties of liquid crystal compositions, they tend to be short lived, since the primary phenomenon producing the display involves turbulence effects caused directly by electrical current flow through the liquid crystal medium; i.e., the materials are electric current sensitive materials and are not directly voltage sensors. Such current flow requires the use of excessive power and tends to cause the liquid crystal materials to deteriorate, seriously reducing the life span of the display.

While the device of the Soref patent may be used with liquid crystal materials of various types, including those demonstrating electric field sensitive birefringence or rotary electro-optical effects, display cells accommodating very thin layers of nematic materials are preferred for the latter kinds of operations. Furthermore, the prior art displays use electrode systems on surfaces of both principal wall elements of the cell, which electrode systems require careful alignment during assembly and are therefore expensive to produce. Such prior art devices, having conducting electrodes on each side of the nematic layer, are also subject to accidental short circuiting between electrode systems, especially when attempts to make thin cells are made.

SUMMARY OF THE INVENTION

The invention is an electric-field controlled, electro-optical analog measurement or display device of the panel type which includes a very thin layer of positive dielectric anisotropy nematic liquid crystalline material directly responsive to electric fields imposed within the nematic material itself and therefore overcoming defects present in the prior art. The invention may employ the basic concepts of the R. A. Soref U.S. Pat. application Ser. No. 264,679 for a "Liquid Crystal Display," filed June 20, 1972 and assigned to the Sperry Rand Corporation. As in the latter Soref application, the nematic material is placed within a thin cell having transparent front and rear cell wall elements with precisely parallel flat sides. The electric control field threading the nematic layer is provided by an array of electrodes placed only on one inner surface of one of the cell-defining wall elements. Birefringence or rotary electro-optical effects of the nematic liquid crystal are controlled by selected voltages applied to the interleaved or interdigital electrode sets which constitute a pair of coplanar cooperating electrode systems, the pair being formed on the inner surface of the one cell side.

One set of digital electrode elements may be operated at a selected potential from a first source, while individuals of the second set are operated at progressively varying potentials through the use of a high impedance distributor conductor across which a second potential source is connected. If the first voltage is held constant while the second is varied, a dark, narrow but fixed-width image simulating, for example, a voltmeter needle may be moved across the display. Other display effects analogous to the analog displays of the aforementioned Soref U.S. Pat. No. 3,675,988 may readily be achieved.

Thus, an analog display is realized employing voltage sensitive liquid crystal materials and birefringence or rotary electro-optical effects in a thin display cell. Alignment of the electrode sets may be accomplished automatically in one easy photographic step, manufacture and assembly of the device being significantly simplified. Because electric control field effects are directly employed, operating power is reduced and the life expectancy of the display cell is increased. Uniformity of construction and long useful life are assured by forming mesas on one or the other of the cell walls or plates, which mesas precisely define the thickness of the nematic layer. The mesa construction permanently defines the width of the active nematic layer, confining it uniformly to a selected width as small as 0.5 microns. Wide angle viewing is attained, as well as relative freedom from parallax effects and from stray specular reflections.

DESCRIPTION OF THE PREFERRED EMBODIMENTS

Figure 1:
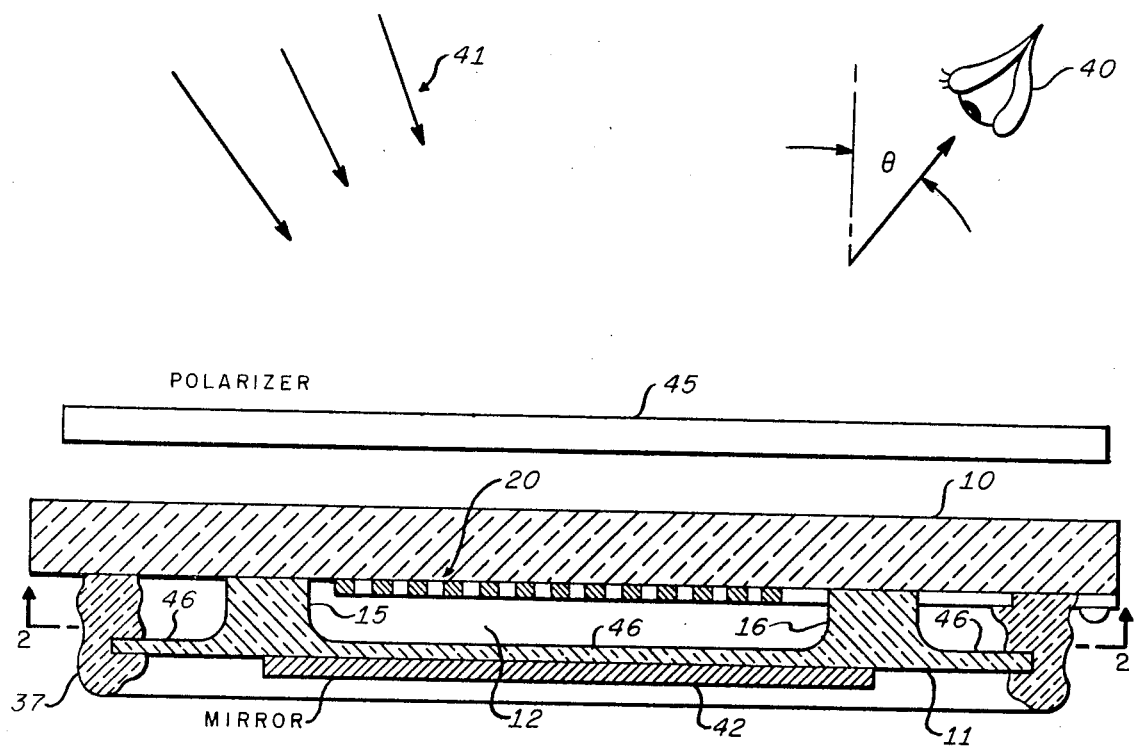
FIG. 1 is an elevation cross section view of one form of the invention.
Figure 2:
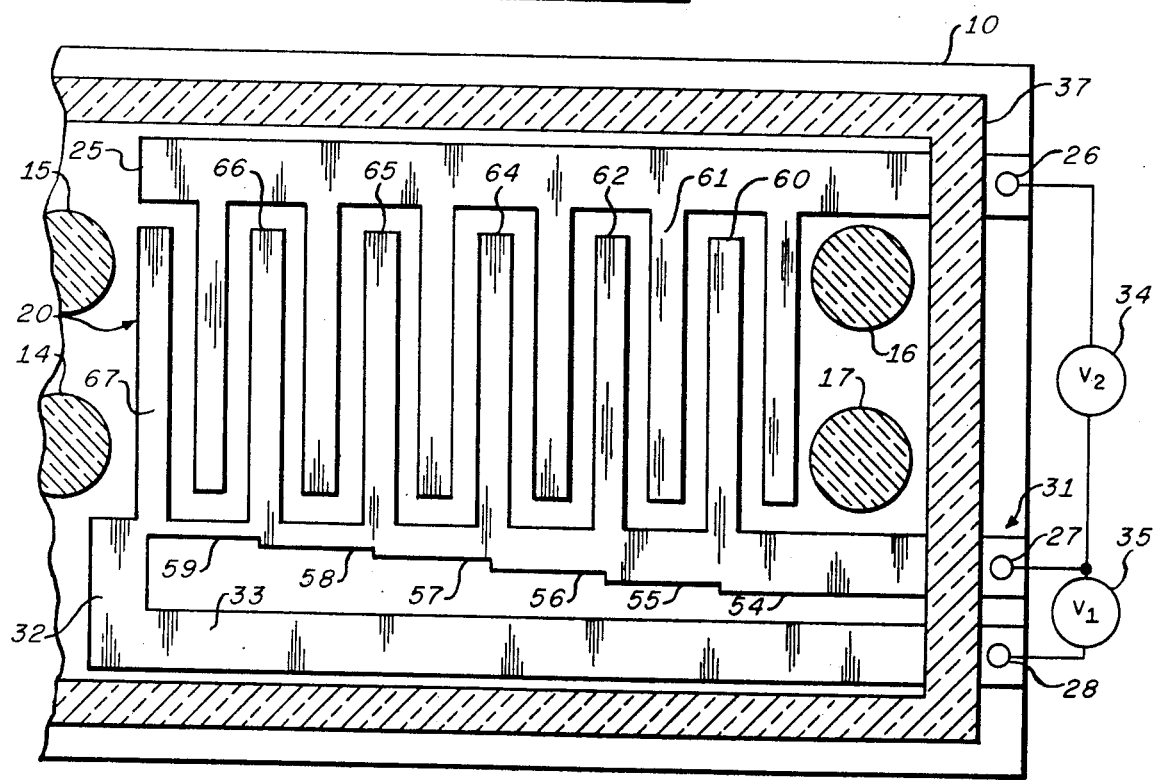
FIG. 2 is a cross section of the FIG. 1 structure taken along the line 2—2.

The novel electrical display or meter is illustrated in FIGS. 1 and 2 in the form of an electric field controlled flat panel display device utilizing a pair of parallel-sided flat glass or optically transparent dielectric plates 10 and 11, plate 11 being specially shaped in order to accommodate a very thin layer of electric field sensitive liquid crystal material 12 particularly within an interior region of the device, as will be explained. Plate 11 may be spaced from plate 10 by a plurality of mesa spacers such as spacers 14, 15, 16, and 17 formed integrally with the inner surface of plate 11. Mesa spacers 14, 15, 16, and 17 are placed conveniently on the inner surface of plate 11 so as not to interfere with the location of the active interdigital electrode system 20 coated on only one or the other of the interior surfaces of the respective plates 10 or 11.

It will be understood that the proportions used in FIG. 1 are appropriately distorted so as to make the figure readily understandable. For example, the electrode system 20 yet to be described must be extremely thin, for example about 400 Angstrom units thick, as it is optically transparent. The thickness of the region between plates 10 and 11 enclosing liquid crystal layer 12 is so small as to provide important results, as will be further described, not available in the prior art turbulence type of liquid crystal display.

Electrode system 20 comprises parallel-disposed conductive and optically transparent electrode elements, such as electrode element 61, coupled to an elongate distributor conductor 25 having an exterior terminal 26. Electrode system 20 also includes parallel-arranged conductive and optically transparent electrode elements such as elements 60 and 62 coupled to an elongate distributor conductor 31 having an external electrical terminal 27. The electrodes 60 and 61, for example, may be spaced apart about 12 microns (24 microns center-to-center) and be 10 to 15 microns wide. The respective electrodes of the arrays including electrodes 60 and 61 are arranged in parallel interdigital fashion, as seen particularly in FIG. 2. By virtue of their relatively low resistance, the terminal 26, the elongate distributor conductor 25, and the array of electrode elements such as electrode element 61 are substantially equipotential surfaces and all come substantially instantaneously to the potential applied at terminal 26.

In the cooperating digital electrode array including electrode elements such as elements 60 and 62, these electrode elements are also low resistance transparent electrodes. The character of the elongate distributor conductor 31 is, however, distinct from that of elongate distributor conductor 25 in that it demonstrates relatively high impedance or resistivity characteristics. Section 54 of distributor 31 may have the same conductivity as elongate distributor conductor 25, but it is provided with other series connected sections 55, 56, 57, 58, and 59 which may be of substantially equal lengths, for example, which have progressively lower conductivities. Such different resistance sections may be readily achieved in well known ways by the control of the thickness of the indium or tin oxide layer forming elongate distributor conductor 31, by control of its width, or by other well known techniques, such controls being exercised as the arrays are formed. The different resistances may also be achieved in a conventional way by etching or otherwise progressively removing more and more of the tin or indium oxide layer during manufacture.

Figure 6:
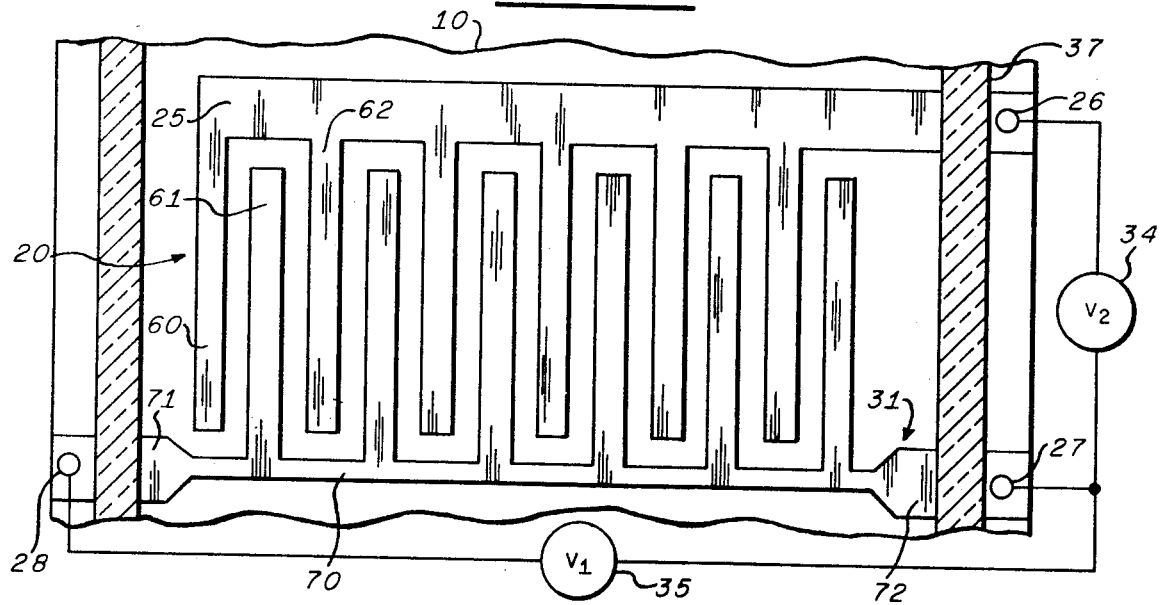
FIG. 6 is similar to FIG. 2 showing in cross section a plan view of an alternative form of FIGS. 1 and 2.

Accordingly, when a significant potential difference is applied between the effective ends of elongate distributor conductor 31, the potentials at each of the junctions between the adjacent sections 54, 55, 56, 57, 58, and 59 progressively increase or decrease non-linearly (FIG. 2), as desired. Thus, the transparent low-resistivity electrode elements 60, 62, 64, 65, 66, and 67, if coupled respectively to the junctions between sections 54, 55, 56, 57, and 59 may each find themselves at progressively different potential levels. An external end of elongate distributor conductor 31 is supplied with a terminal 27. The opposite end of elongate distributor conductor 31 is connected by preferably low resistance conductors 32 and 33 to a terminal 28 conveniently located near terminal 27 so that terminals 20, 27, and 28 may be located all at one end of the display. A linear increase in potential can be obtained with non-tapered sections between digits, as illustrated in FIG. 6.

Dielectric plates 10 and 11 may be constructed from any suitable glass or generally from a transparent insulating material compatible with the optical and hermetic sealing requirements of the display cell system. For example, the material may be selected to have an optical index of refraction similar to that of the electric field sensitive or nematic material 12 so as to avoid undesired reflections at optical interfaces. So that the active material may be preserved in its pure form and protected from contaminants and also remain uniform in thickness, a quadrilateral dielectric wall 37 is formed as a continuous enclosure wall at the four edges of plates 10 and 11. Construction of the device may be generally according to techniques described by R. A. Soref and R. A. Carey in the U.S. patent application Ser. No. 331,436 for "Liquid Crystal Display Apparatus," filed Feb. 12, 1973 and assigned to the Sperry Rand Corporation and by R. A. Soref in the U.S. patent application Ser. No. 331,437 for "Liquid Crystal Reflective Display Apparatus," filed Feb. 12, 1973, and assigned to the Sperry Rand Corporation. Such construction permits the thickness of the liquid crystal medium to lie between 0.5 to 2.5 microns or, preferably, between 1.4 and 1.9 microns.

Figure 5:
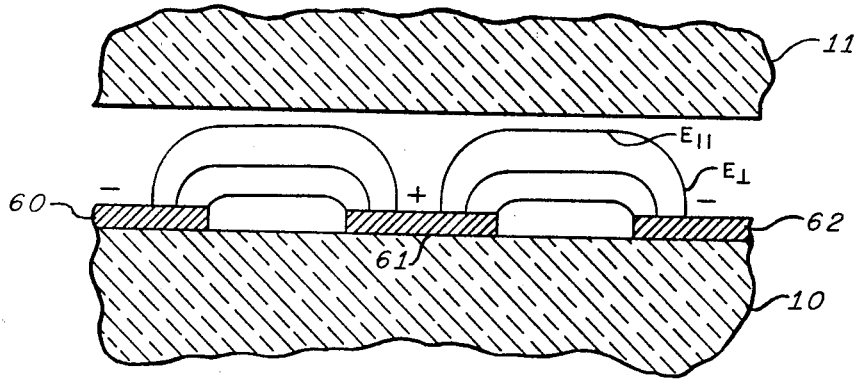
FIG. 5 is an enlarged cross section view of a portion of FIG. 1 for illustrating electric field configurations employed in the invention.

Referring especially to FIG. 2, it will be seen that particular arrays of electrodes such as that employing array electrode element 61 and that employing elements 60 and 62 are shown; it will be understood that the figures are drawn in such proportions particularly for illustrating the basic principles of the invention with clarity. In actual practice, an array of many thin and closely spaced electrode elements such as electrode element 61 will be used, with closely spaced interdigitally located electrode elements such as electrode elements 60 and 62. Electrode elements 60 and 62 may be instantaneously negative, for instance, while electrode element 61 may be instantaneously positive. In such a case, instantaneous electric fields are set up between the several alternate electrode elements. As in FIG. 5, an electric field of one sense may be found in the region between the oppositely poled electrode elements 60 and 61, while an electric field of a reversed sense is found between electrode elements 61 and 62. The electric fields lie primarily parallel to plates 10 and 11, although the fields also fringe somewhat in other directions.

Accordingly, the one set of interdigital electrode elements such as element 61 attached to elongate distributor conductor 25 all reach the potential applied at terminal 26 when a voltage source 34, which may be variable, is connected between terminals 26 and 27. When a second voltage source 35, which may be variable, is connected across the elongate resistive distributor conductor 31, electrode elements 60, 62, 64, 65, 66, and 67 arrive at successively different potentials with respect to all of the elements of the array including electrode element 61. Thus, for electrode elements 60, 62, 64, 65, 66, 67, potential differences are provided between those same electrode elements by the successive high impedance paths 54 through 59. Thus, the potential $V_{AE}$ between adjacent electrode elements (of different arrays) varies as a function of the distance $x$ along the elongate distributor conductors 25 and 31.

It will be seen that manipulation of the voltages $V_1$ and $V_2$ from voltage sources 34 and 35 will determine which adjacent set of electrode elements, such as electrode elements 60, 61, will cause a display to occur. In one mode of operation, for example, a variable reference voltage $V_1$ is supplied across terminals 27 and 28 and thus across the sections 55, 56, 57, 58, and 59 of resistive distributor conductor 31. At the same time, an unknown voltage $V_2$ may be supplied by a source 34 to terminals 26 and 27. The superposition of voltages $V_1$ and $V_2$ is such that, as in FIG. 4, a display is produced between distances $x_1$ and $x_2$ in the form of a narrow dark image. If the reference voltage $V_2$ is held constant while the unknown voltage $V_1$ is varied, the narrow, dark image or window retains its fixed width, and is moved perpendicular to its thin dimension proportionally along the interdigital electrodes. The distance between $x_1$ and $x_2$ may be made quite small, so that the width of the display window is quite small, resembling the needle of a conventional electrical meter. In any event, the location of its centroid 50 is proportional to the unknown voltage and that voltage value may be read off in the conventional manner using a scale engraved on the outer surface of plate 10, for example.

Figures 3, 4:
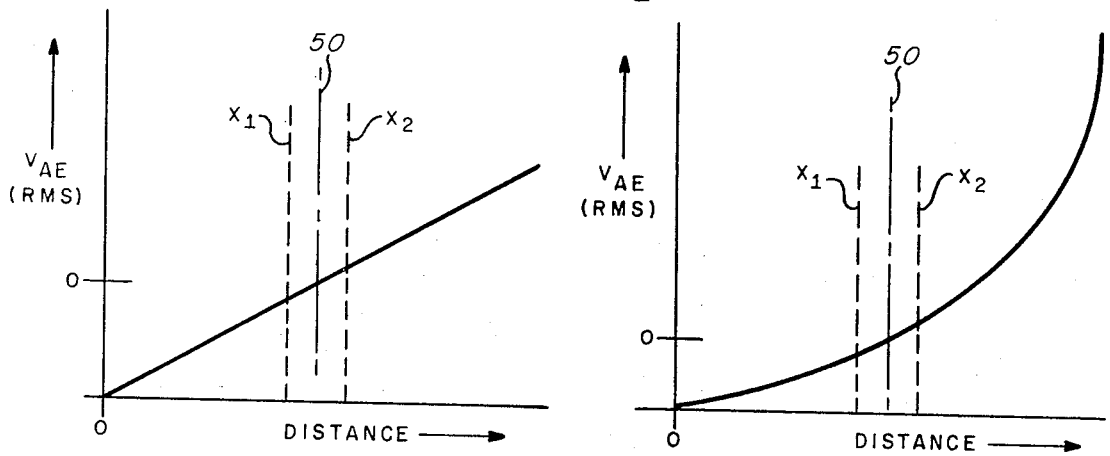
FIGS. 3 and 4 are graphs useful in explaining the operation of the invention.

It is acceptable for some purposes to reverse the roles of voltages $V_1$ and $V_2$; in any event, if voltage $V_2$ is held constant while voltage $V_1$ is varied, the width of the window (or the distance between $x_1$ and $x_2$ in FIG. 3) is proportionately varied. Regular or equal incremental resistance changes between the several sections 54 through 59 may be employed in a linear manner (FIG. 3 or FIG. 6), or the changes may be made non-linear by corresponding non-linear successive impedance changes of the sections so as to produce non-linear displacement of the display (FIG. 2 and FIG. 4). Alternatively, as in FIG. 6, the elongate distributor conductor 31 may contain short sections 71 and 72 at its ends that are of relatively high conductivity, with its primary and most extensive section 70 having high impedance or resistivity. The ends 71, 72 are brought out to expose terminals 27, 28 which are connected across power source 35, as before. It will be understood that $V_1$ and $V_2$ may be either unidirectional or alternating voltages.

The preferred operation of the apparatus is according to a mode employing strictly electric-field sensitive electrode configurations and nematic liquid crystal mixtures having relatively high dielectric anisotropy. Being a field-effect display, it is important for optimum performance that the nematic liquid crystal molecules have a definite orientation in the absence of an applied electric field. One such orientation is the homeotropic ordering discussed with regard to the birefringence sensitive arrangements of the R. A. Soref U.S. patent application Ser. No. 264,679 for "Liquid Crystal Display Apparatus," filed June 20, 1972 and assigned to the Sperry Rand Corporation. Other highly suitable arrangements, include a spontaneously twisted arrangement of molecules that gives rise to useful rotary electro-optical effects and permits use of very thin cells, as disclosed in the R. A. Soref patent application Ser. No. 363,921 for "Rotary Electro-Optical Effect Liquid Crystal Display Apparatus," filed May 25, 1973 and assigned to the Sperry Rand Corporation. The thin nematic layer in which the desired electrically controllable effects are to be viewed may be selected from well known liquid crystal materials, including mixtures of known nematic liquid crystals having storng positive dielectric anisotropy, operating at relatively low drive voltages at room temperature, and composed, for example, of equal molar proportions of the known nitrile Schiff bases. Preferred materials have a relatively large positive dielectric anisotropy, such as $\epsilon_\| = 25$ and $\epsilon_\perp = 8$.

Since birefringence or similar electric field sensing effects are employed in the invention, rather than the prior art turbulence effect, the invention is completed as shown in FIG. 1 by the use of an optical circular polarizer 45 spaced from or attached to the exterior surface of the plate 10. Further, a mirror 42 is attached to the exterior surface of plate 11, since the display is normally used in the reflective mode. The arrangement of circular polarizer and mirror in FIG. 1 pertains specifically to an induced birefringence kind of display in which the initial molecular ordering is perpendicular to plates 10 and 11. If the initial ordering were twisted, it would be necessary to use two linear polarizers as described in the above mentioned patent application Ser. No. 363,921. Since the light rays 41 seen in FIG. 1 may approach the electro-optical device from a variety of angles, a corresponding multiplicity of imaging or parallax effects may be viewed by the eye at 40. Since the light rays 41 pass through the region of the liquid crystal material 12 twice, these images appear to emanate from locations where the rays strike mirror 42, rather than strictly from the plane of intersection with the liquid crystal layer. Parallax is minimized by locating the reflecting plane of mirror 42 as close as possible to the liquid crystal layer. For this purpose, the plate 11 is thinned as much as possible consistent with maintaining proper mechanical strength and a diffusing mirror 42 is formed directly on the thinned wall. Mirror 42 is thus designed for providing diffuse reflection and consequently for permitting wide angle viewing of the display with substantially no multiple imaging. The effect of the electric field applied through terminals 26, 27, and 28 is observed in the preferred form of the invention by direct viewing with the eye, as at 40 in FIG. 1, diffuse ambient light as represented by rays 41 that pass through circular polarizer 45 and through plate 10, the liquid crystal material in region 12, and the plate 11, thereupon to be reflected by the diffuse mirror 42 affixed to the exterior surface of plate 11. The reflected light retraverses the region 12, plate 10, and circular polarizer 45 to reach the eye at 40. Operation of other optical aspects of the invention is generally as explained in the aforementioned patent applications.

According to the invention, a flat panel, electric field controlled device is provided for the measurement or display of electrical parameters such as voltage, the voltage sensing effect being provided by a nematic liquid crystal medium having high positive dielectric anisotropy and placed in a thin flat-sided optically transparent cell having suitable electrodes. Optical transmission of the nematic liquid crystal medium is controlled by voltages applied to interdigital arrays of parallel electrode elements affixed on the inner surface of only one of the transparent parallel cell walls. Continuous relative changes in the respective potentials applied to the electrode arrays provide continuous analog movement of the borders between birefringent and non-birefringent areas formed in the liquid crystal medium.

In a representative device, one set of digital electrode elements may be operated at a selected potential from a first source, while individuals of the second set are operated at progressively varying potentials through the use of a high impedance distributor conductor across which a second potential source is connected. If the first voltage is held constant while the second is varied, a dark, narrow but fixed-width image simulating, for example, a voltmeter needle, may be moved across the display. Alternatively, a dark bar can be made to elongate across the display in response to an analog voltage. Whether a moving bar or needle is obtained depends in part upon the relative phases of the two voltage sources.

Other display effects may be achieved. Because of the three input terminals employed in the invention, two voltages may be applied to control the movement of the display image by adjusting in time the magnitudes of either or both of the voltages. The device may be designed with two electrode arrays both like the array associated with the high impedance distribution conductor 31 of FIG. 2; thus, four input terminals may be made available for applying voltage gradients across both of the opposed arrays.

A particular feature of the invention lies in the fact that the high impedance distribution system beneficially prevents imposition of excessive voltage gradients within the liquid crystal medium, destructive gradients which would induce dielectric breakdown and arcing through the liquid crystal medium. The impedance of the distribution system is chosen high enough to reduce power consumption for the drive source to an acceptably low value.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. Electric field sensing display apparatus comprising:
   first and second coplanar optically-transparent array means having respective first and second interleaved pluralities of electrically conductive elongate electrode means for defining electric field patterns therebetween,
   first optically transparent plate means having first surface means for supporting said electrically conductive elongate electrode means in spaced substantially parallel alternate cooperative relation,
   first elongate distributor means affixed to said inner surface means and coupled at one end of each of said first plurality of electrically conductive elongate electrode means at spaced intervals along said first elongate distributor means,
   second elongate distributor means affixed to said inner surface means and coupled at one end of each of said second plurality of electrically conductive elongate electrode means at spaced intervals along said second elongate distributor means.
   at least one of said first and second elongate distributor means having a substantially high impedance characteristic with respect to said first and second interleaved pluralities of electrically conductive elongate electrode means,
   second optically transparent plate means in substantially parallel spaced relation with said first optically transparent plate means and having second surface means,
   wall means for completing enclosure means defined in part by said first and second optically transparent plate means,
   terminal means exterior of said enclosure means adapted to be coupled to a voltage source for producing a voltage gradient along said elongate distributor means having a high impedance characteristic, and
   electric field sensitive means disposed within said enclosure means for controlling the degree of optical transmission of said electric field sensing display apparatus in accordance with the value of said voltage gradient.

2. Apparatus as described in claim 1 wherein said first elongate distributor means is coupled at one end of each of said first plurality of electrically conductive electrode means at substantially equally spaced intervals along said first elongate distributor means.

3. Apparatus as described in claim 1 wherein said high impedance characteristic is constant along the region coupled to said first plurality of electrically conductive elongate electrode means.

4. Apparatus as described in claim 1 wherein said high impedance characteristic progressively varies along the region coupled to said first plurality of electrically conductive elongate electrode means.

5. Apparatus as described in claim 1 wherein said electric field sensitive means comprises a liquid crystal material demonstrating positive dielectric anisotropy.

6. Apparatus as described in claim 5 wherein the thickness of said liquid crystal material between said first and second surface means lies substantially between 0.5 and 2.5 microns.

7. Apparatus as described in claim 5 wherein the thickness of said liquid crystal material between said first and second surface means lies substantially between 1.4 and 1.9 microns.

8. Apparatus as described in claim 1 wherein at least one of said first and second elongate distributor means has a high electrical conductivity characteristic substantially equal to the electrical conductivity characteristic of said first and second interleaved pluralities of electrically conductive elongate electrode means.

9. Apparatus as described in claim 1 including terminal means exterior of said enclosure means adapted to be coupled to a second voltage source for placing the entirety of said elongate distributor means having a high electrical conductivity at substantially the voltage of said second voltage source.

10. Apparatus as described in claim 5 further including:
    optical polarizer means permitting illumination of and viewing of said liquid crystal electric field sensitive means therethrough, and
    mirror means spaced from said liquid crystal electric field sensitive means opposite said optical polarizer means for returning light through said apparatus.

* * * * *